(12) United States Patent
Zhang et al.

(10) Patent No.: US 10,489,466 B1
(45) Date of Patent: Nov. 26, 2019

(54) METHOD AND SYSTEM FOR DOCUMENT SIMILARITY ANALYSIS BASED ON WEAK TRANSITIVE RELATION OF SIMILARITY

(71) Applicant: EMC IP Holding Company LLC, Hopkinton, MA (US)

(72) Inventors: Lei Zhang, Shanghai (CN); Chao Chen, Shanghai (CN); Kunwu Huang, Shanghai (CN); Hongtao Dai, Shanghai (CN); Jingjing Liu, Shanghai (CN); Ying Teng, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 560 days.

(21) Appl. No.: 15/279,794

(22) Filed: Sep. 29, 2016

(51) Int. Cl.
| | |
|---|---|
| *G06F 16/20* | (2019.01) |
| *G06F 16/93* | (2019.01) |
| *G06F 16/11* | (2019.01) |
| *G06F 16/28* | (2019.01) |
| *G06F 16/951* | (2019.01) |
| *G06F 16/35* | (2019.01) |

(52) U.S. Cl.
CPC ............ *G06F 16/93* (2019.01); *G06F 16/113* (2019.01); *G06F 16/285* (2019.01); *G06F 16/35* (2019.01); *G06F 16/355* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 2009/0157597 A1* | 6/2009 | Tiyyagura | ............... G06F 16/35 |
| 2012/0239650 A1* | 9/2012 | Kim | ...................... G06F 16/355 707/737 |
| 2013/0151522 A1* | 6/2013 | Aggarwal | ......... G06F 16/24568 707/737 |
| 2014/0236941 A1* | 8/2014 | Johns | .................. G06F 16/9535 707/730 |
| 2015/0127323 A1* | 5/2015 | Jacquet | ................. G06F 17/271 704/9 |
| 2016/0110428 A1* | 4/2016 | Vasenkov | ............. G06F 16/367 707/776 |

* cited by examiner

*Primary Examiner* — Jau Shya Meng
(74) *Attorney, Agent, or Firm* — Chamberlain, Hrdlicka, White, Williams & Aughtry

(57) ABSTRACT

A method for document similarity analysis. The method includes obtaining a document to be archived, obtaining indexing terms for the document to be archived, and identifying document categories similar to the document to be archived, based on indexing terms and corresponding term frequencies. The method further includes making a determination that a weakly similar document category exists and based on the determination: generating a new document category and registering the document in the new document category, and registering the document in the weakly similar document category.

17 Claims, 6 Drawing Sheets

METHOD AND SYSTEM FOR DOCUMENT SIMILARITY ANALYSIS BASED ON WEAK TRANSITIVE RELATION OF SIMILARITY

BACKGROUND

A significant number of electronic documents are stored by companies in their document repositories. Given the number of documents that are stored, it is difficult to easily locate documents based on similarity with a target document.

DETAILED DESCRIPTION

Figure 1:
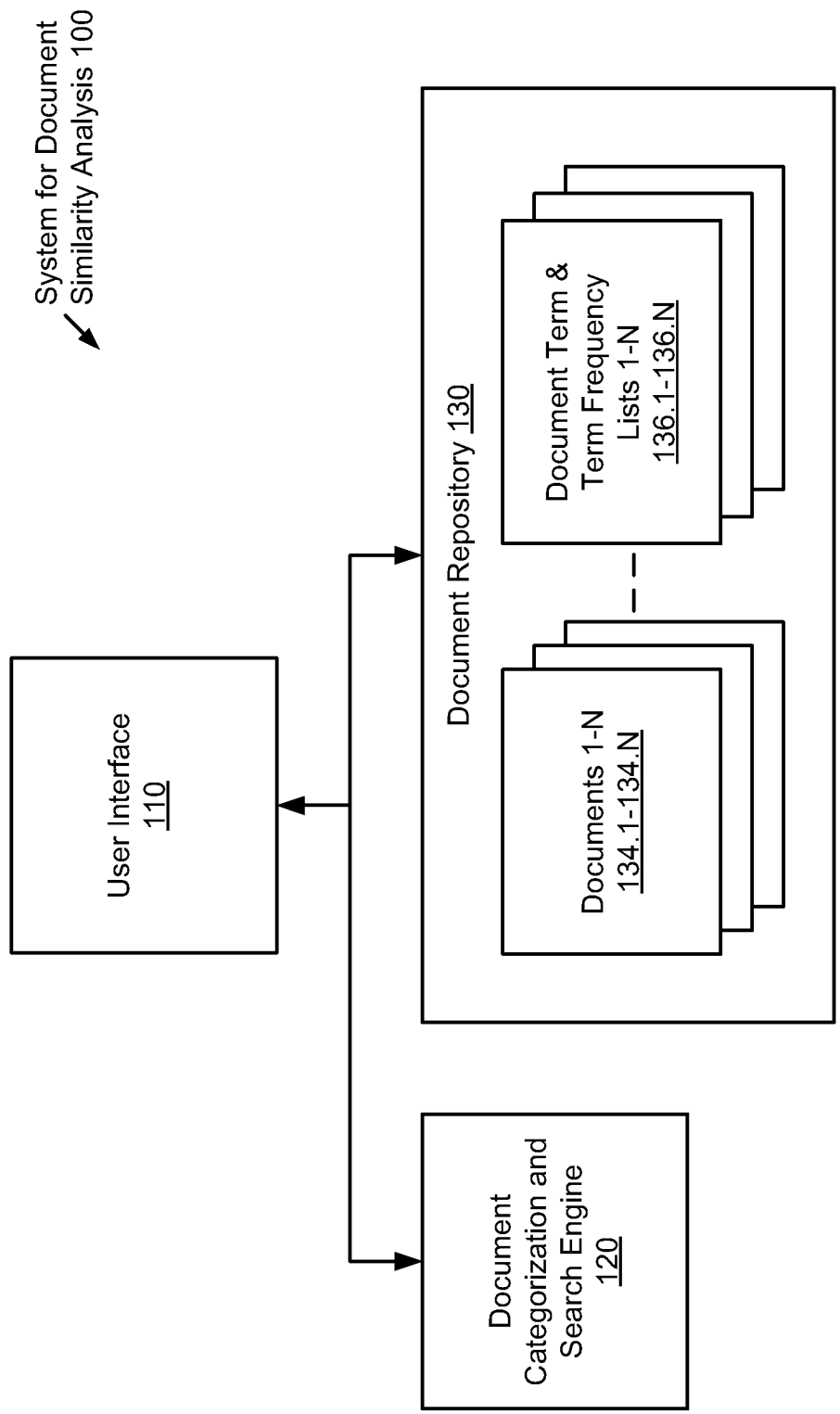
FIG. 1 shows a system, in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology are directed to methods and systems for assessing document content similarity and for identifying documents that contain at least a certain degree of similar content. More specifically, in one or more embodiments of the technology, the content analyzed for similarities is text. Content of a target document may be compared to content of multiple other documents, for example, content located in archived documents. The methods may be employed, for example, where a large volume of archived documents may need to be reviewed for similarity to a target document.

In one or more embodiments of the technology, the similarity analysis is based on an approach that groups similar document into categories of documents, in a document repository. Accordingly, when a search for documents that match a target document is performed in the document repository, categories that are similar to the target document are first identified, and subsequently, documents with a high degree of similarity to the target document are retrieved from the identified categories.

Similarity does not necessarily satisfy transitive relations. For example, if a document in a category A is similar to a document in category B, and the document in category B is similar to a document in category C, the document in category A may not necessarily be similar to the document in category C. Accordingly, in a conventional system, where documents are organized in document categories solely based on similarity, and where the decision between similar and not similar may be based on whether a similarity threshold is reached, a document A that is known to be similar to a document B may be similar to a category C while document B may not be similar to category C. Accordingly, when assigning documents to categories, document A may be assigned to category C, whereas document B may not be assigned to category C. As a result, when a search for a target document is performed, e.g., for all documents that are similar to document A, not all similar documents may be located. In the above scenario, document B, although similar to document A, may not be reported because documents A and B are not located in the same category of similar documents.

In one embodiment of the technology, a system in accordance with an embodiment of the technology addresses the above limitations by considering weak transitive relations in similarity that are known to exist when assessing document similarity. Based on these weak transitive relations in similarity, one may conclude, for example, that if a document A is very similar to a document B, and document B is very similar to a document C, document A must be somewhat similar to document C. Accordingly, different levels of similarity such as "highly similar" and "somewhat similar" may be distinguished, in accordance with one or more embodiments of the technology. A document categorization that considers weak transitive relations in similarity, in accordance with one or more embodiments of the technology, is described below with reference to FIGS. 3-5.

FIG. 1 shows a schematic diagram of a system in accordance with one or more embodiments of the technology. Specifically, FIG. 1 shows a system for document similarity analysis (100) enabling users of the system to analyze documents for similarity with a target document. The system may include a user interface (110), a document categorization and search engine (120) and a document repository (130). Each of these components is described in detail below.

In one or more embodiments of the technology, a user may access the user interface (110) in order to identify, in a set of documents, documents that include content similar to the content of a target document. Accordingly, the user interface may enable the user to specify the target document. The target document may be specified by the user, for example, by uploading the target document, or by selecting the target document from a set of documents that are accessible via the user interface. The user interface (110) may further be used to present the results of the document search (i.e., the identified documents) to the user. The identified documents may be presented to the user, for example, in the form of a document list. Further, the degree of similarity may be reported to the user via the user interface. The identified documents may be reported to the user, in the order of similarity, e.g., a document with the highest degree of similarity to the reference document may be reported first. The user interface may in addition be used to configure the document search. For example, the user interface may enable the user to specify a document repository from where documents to be analyzed for similarities may be obtained, it may enable the user to add/remove documents from the document repository, and/or it may enable the user to parameterize the document categorization and search engine (as further discussed below), etc.

Figure 6:
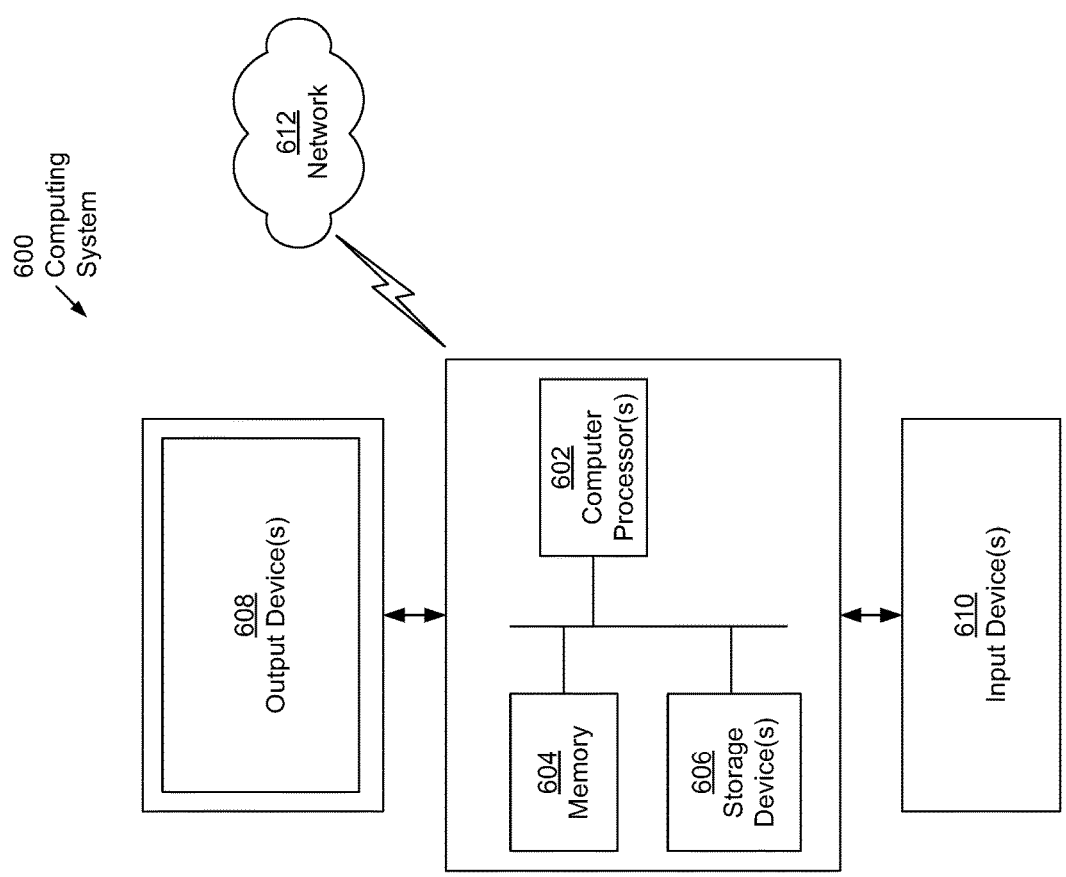
FIG. 6 shows a computing system in accordance with one or more embodiments of the technology.

The user interface, in accordance with one or more embodiments of the technology, may be executing on a computing device similar to the exemplary computing device shown in FIG. 6. In one or more embodiments of the technology, the user interface may interface with the document categorization and search engine (120) and the document repository (130).

Continuing with the discussion of FIG. 1, the system (100) further includes the document categorization and search engine (120). In one or more embodiments of the technology, the document categorization and search engine executes software instructions in the form of non-transitory computer readable program code described in detail below, with reference to FIGS. 3-5. The instructions may enable the document categorization and search engine (120) to convert a target document and/or one or more archived documents into a form that allows for quantitative assessment of document similarity. The instructions may, for example, include functionality to tokenize text content, to identify frequently occurring terms and to store these frequently occurring terms as indexing terms, along with the frequency of occurrence, as further described below, with reference to FIGS. 3-5. Based on the indexing terms, the document categorization and search engine may further perform a comparison between documents and/or between a document and a document category. The categorization and search engine (120) may execute on a computing device that may be similar to the exemplary computing device shown in FIG. 6, and may be any type of mobile, desktop, server, embedded, or other hardware capable of performing at least one of the steps described below with reference to FIGS. 3-5.

Continuing with the discussion of FIG. 1, in one or more embodiments of the technology, the system (100) includes a document repository (130). The document repository may store archived documents (134.1-134.N). Documents (134) may be stored in any file format suitable for the storage of text. These file formats may include, for example, plain text files (.txt), Microsoft® Word files (.doc, .docx), Adobe® Acrobat files (.pdf), etc. Those skilled in the art will appreciate that the technology is not limited to the aforementioned protocols. Rather, any file that may contain text, either exclusively, or in combination with non-text content (e.g. CAD files), regardless of the file format, may be processed.

The document repository (130) may be any type of document storage suitable for storing at least one archived document. The document repository may be, for example, an enterprise content management system, a database, a folder or a group of folders on a storage device. The archived document repository may be local, i.e., it may be located on the computing device on which the user interface is executing, or it may be remote, e.g., located on a physical server. The document repository may be located in any type of non-volatile storage, including, for example, a hard disk drive, a redundant array of independent disks (RAID), network attached storage (NAS), cloud storage, etc. Further, at least some of the content of the document repository (130) may alternatively or additionally be stored in volatile memory, e.g., in RAM.

In one or more embodiment of the technology, the document repository (130) further includes document term and term frequency lists (136.1-136.N). More specifically, one document term and term frequency list (136) may be stored in the document repository per document (134). A document term and term frequency list, in accordance with an embodiment of the technology, includes indexing terms that characterize the content of the corresponding document, as subsequently described in FIG. 2A. For each of the index terms, a frequency of the term, i.e., the number of occurrences of the term in the document, is provided.

One skilled in the art will recognize that the architecture of the system is not limited to the components shown in FIG. 1. For example, the components of the system may be collocated on a single computing device, or they may be distributed in various ways. One or more of the components may be located on a server, in a data center, in the cloud, etc. The components may be provided by a single entity, or by multiple entities.

If components of the system are distributed, the components may be connected via a network (e.g., a local area network (LAN), a wide area network (WAN) such as the Internet, mobile network, or any other type of network) enabling the components, including the user interface, the document repository, the document content identifier encoding engine and/or the document content identifier similarity analysis engine, to communicate. The network may implement any combination of wired and/or wireless communication protocols. The communication between the components of the system (100) may include any combination of secured (e.g., encrypted) and non-secured (e.g., un-encrypted) communication. The manner in which the components of the system communicate may vary based on the implementation of the technology.

Figure 2A:
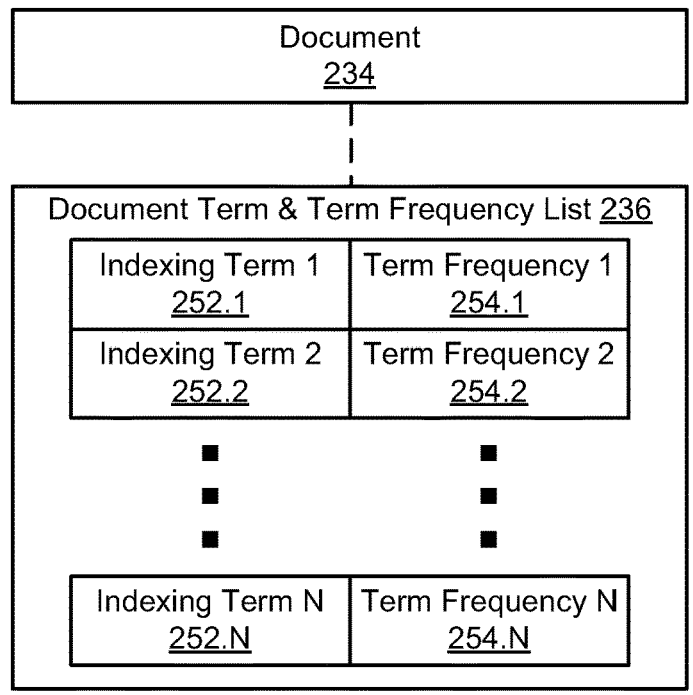
FIGS. 2A and 2B show data representations, in accordance with one or more embodiments of the technology.

FIG. 2A shows a data representation, in accordance with one or more embodiments of the technology. The data representation shown in FIG. 2A includes a document (234), as it may be stored in the document repository (130). The data representation further includes a document term and term frequency list (236), in accordance with one or more embodiments of the technology. The document term and term frequency list (236) is associated with the document (234). In one embodiment of the technology, there is one document term and term frequency list (236) for each document (234), in the document repository (130). The document term and term frequency list (236), in accordance with one or more embodiments of the technology, includes indexing terms (252.1-252.N) and term frequencies (254.1-254.N). The indexing terms may have been extracted from the document (234) that the document term and term frequency list (236) is associated with, as subsequently described in FIGS. 3-5. A set of indexing terms for a document may include, for example, the terms "query", "document", "factor", and "term". The term frequencies may be for example, 47, 44, 39, and 38, indicating the number of instances of the indexing terms found in the document.

Figure 2B:
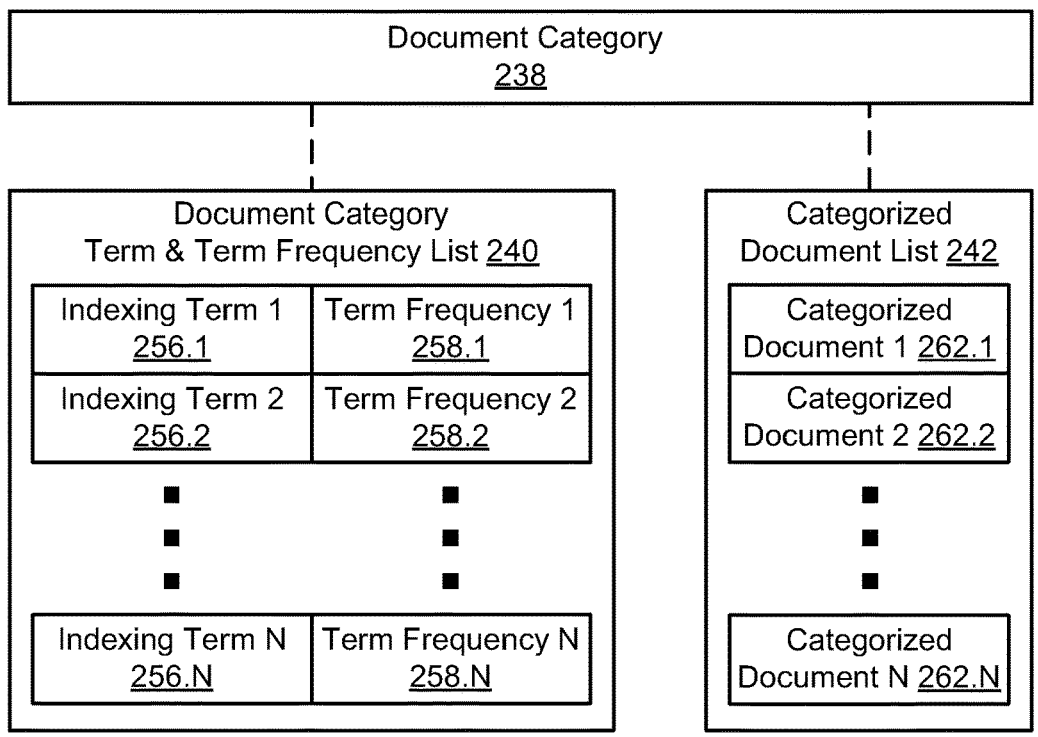

FIG. 2B shows a data representation, in accordance with one or more embodiments of the technology. The data representation shown in FIG. 2B includes a document category (238), a document category term and term frequency list (240) and a categorized document list (242). A document category may have been established for a set of documents that have similar content. Accordingly, a number of documents (234) may be assigned to a document category (238). Further, a single document may be assigned to multiple document categories, if the document is sufficiently similar to these document categories. Similarity may be assessed using the document category term and term frequency list (240) based on the indexing terms (256) and term frequencies (258) stored in the document category term & term frequency list (240). For example, a comparison of the document category term & term frequency list (240) with a document term & term frequency list (236), associated with a particular document, may result in a determination that the document is similar (or is not similar) to the document category. The methods used to make such a determination and to generate a document category term and term frequency list are described below with reference to FIGS. 3-5. The document category term and term frequency list (240) in accordance with an embodiment of the technology, is equivalent to the document term and term frequency list (236), however, while the document term and term frequency list (236) is associated with a particular document (234), the document category term and term frequency list (240) is associated with a document category (238), which may include multiple or many documents (234). In one embodiment of the technology, documents (234) that are deemed similar to the document category (238) are associated with the document category (238) by adding the documents to the categorized document list (242) as categorized documents (262.1-262.N). A document may be added to the categorized document list (242) by adding an identifier of the document, e.g. the document name, to the categorized document list. Document category term & term frequency lists and categorized document lists may be stored in the document repository or alternatively in any other repository, without departing from the technology.

Figure 3:
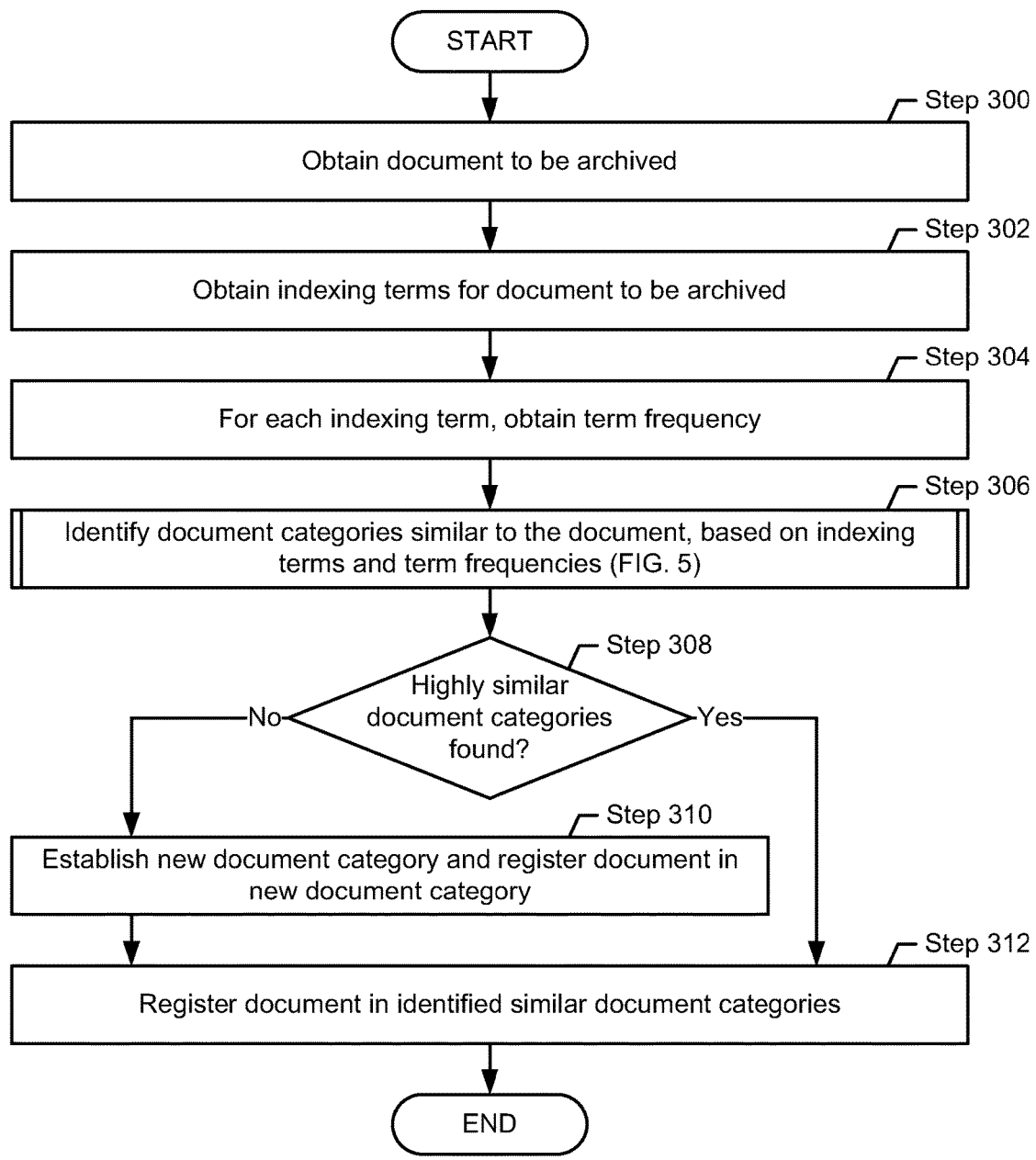
FIGS. 3-5 show flowcharts in accordance with one or more embodiments of the technology.
Figure 4:
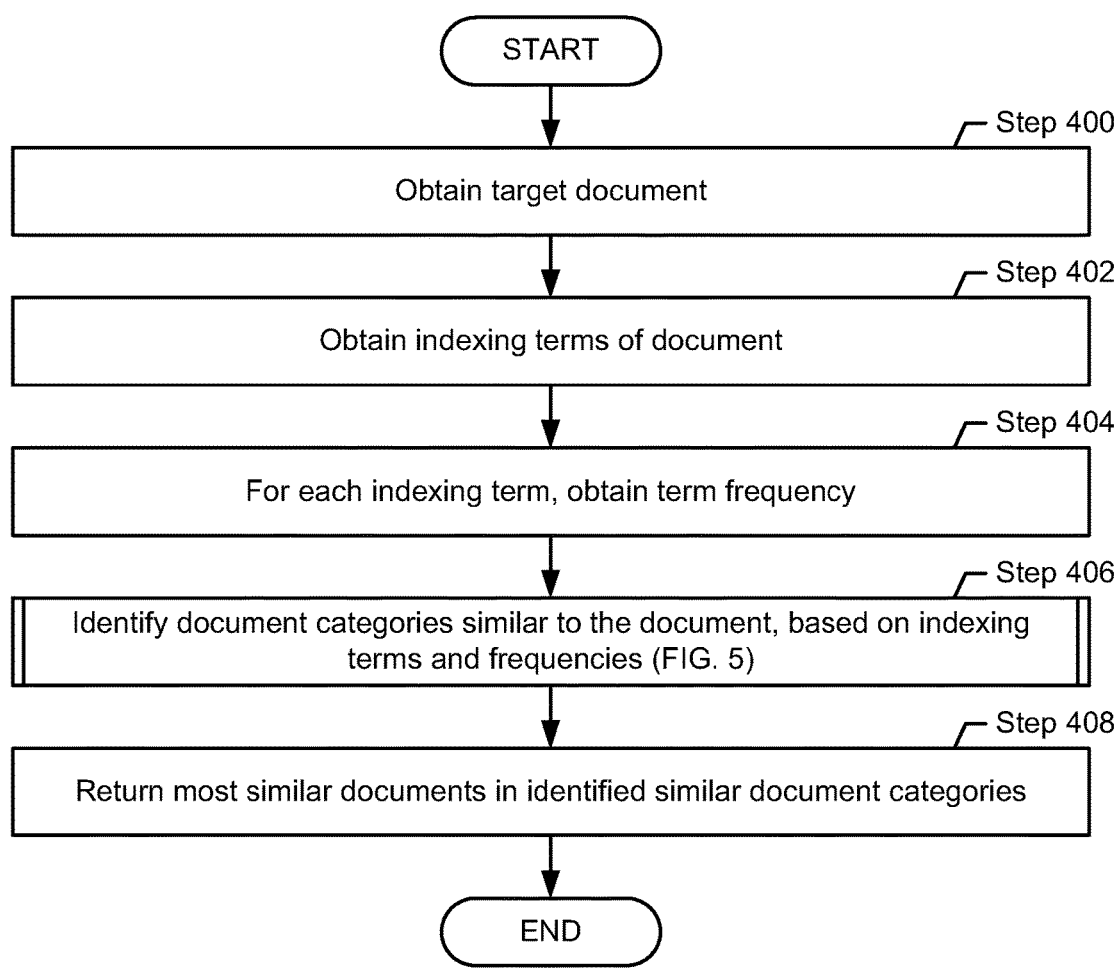
Figure 5:
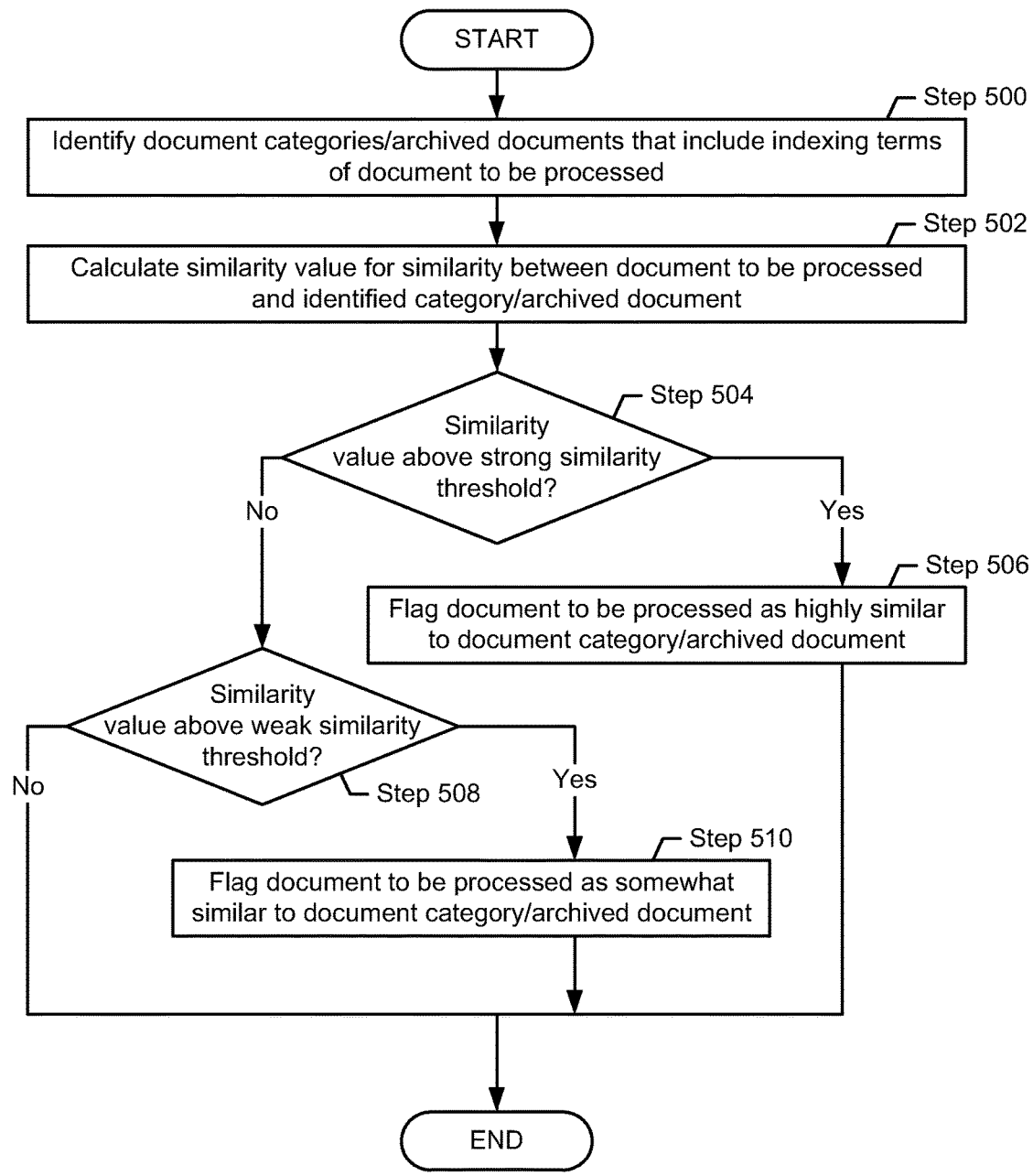

FIGS. 3-5 show methods for assessing the similarity of documents, in accordance with one or more embodiments of the technology. FIG. 3 describes the archiving of a document. FIG. 4 describes the identification of documents that are similar to a target document. FIG. 5 describes the calculation of document similarity, required for archiving documents and for identifying documents with similarities to the target document.

While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-5 may be performed in parallel with any other steps shown in FIGS. 3-5 without departing from the technology.

FIG. 3 shows a method for archiving a document, in accordance with one or more embodiments of the technology. The steps shown in FIG. 3 may be executed when the document repository is initially established and/or when an additional document is added to the document repository. The steps may be executed for each document that is added to the document repository.

Turning to FIG. 3, in Step 300, the document to be archived is obtained. The document to be archived may be obtained from a user or administrator providing the document, or alternatively it may be provided by a computing system without the involvement of a user. As previously discussed, the document to be archived may be any type of document that includes text content, but that may, in addition, also include non-text content.

In Step 302, indexing terms are obtained for the document received in Step 300. Indexing terms may be obtained by parsing the document and by identifying the most frequently occurring terms. Identifying indexing terms may require additional steps such as, for example, the removal of stop words from the document content. Stop words may be frequently occurring words such as, for example "the", "a" "to", etc. that may not serve as meaningful keywords for representing the document content in a document content identifier. Further, the document content may be stemmed, i.e., words or terms in the document may be replaced by the corresponding word stems. For example, the words "fishing", "fished" and "fisher" may be reduced to the root word fish. Alternatively, lemmatization may be used to obtain the word stems.

Frequently occurring terms in the document may be considered indexing terms which may be obtained, for example, by generating a sorted list of the word stems. The list may be sorted based on the frequency of occurrence of the word stems. For example, the 25 or 100 word stems with the highest frequency of occurrence may be chosen as indexing terms. In Step 304, the frequency of each indexing term is documented.

In Step 306, document categories that are similar to the document are identified, based on the indexing terms and frequencies obtained in Steps 302 and 304. A description of the identification of similar document categories is provided in FIG. 5. The identified document categories may include document categories that are considered only somewhat similar to the document, but also document categories that are considered highly similar to the document.

In Step 308, a determination is made about whether a highly similar document category was found. If no such document category was found, the method may proceed to Step 310. Alternatively, if a highly similar document category was found, the method may directly proceed to Step 312. Multiple highly similar document categories may be found, if there is a high degree of similarity between the document and multiple document categories. The determination, in accordance with one or more embodiments of the technology, is made based on a quantification of the similarity between the indexing terms of the document and the indexing terms of the document category. A detailed description of the metrics used, and the quantitative comparison is provided below with reference to FIG. 5.

In Step 310, a new document category is established, and the document is registered in the newly established document category. In one embodiment of the technology, establishing the new document category involves assigning the indexing terms and the term frequencies of the document to be archived to the newly established document category. Accordingly, the newly established document category is characterized by the indexing terms and term frequencies of the document that triggered the generation of the new document category. In one embodiment of the technology, the indexing terms and the term frequencies for a document category never change, i.e., the document category will always be categorized by the indexing terms and term frequencies of the document that triggered the generation of the new document category, even if this document is removed from the document category. The registration of the document in the newly established document category is performed by adding an identifier of the document, e.g., the document name, to the categorized document list of the newly established document category.

In Step 312, the document is registered in the identified similar document categories. The registration of the document in a document category is performed by adding an identifier of the document, e.g., the document name, to the categorized document list of the document category. If multiple similar document categories were found, the document may be registered in all of these categories. These categories, in accordance with an embodiment of the technology include highly similar document categories, but also categories with a lesser similarity.

FIG. 4 shows a method for identification of documents, in the document repository, that are similar to a target document.

Turning to FIG. 4, in Step 400, the target document to be compared is obtained. The target document may be obtained from a user that provides the document or from a computing system, without the involvement of a user. The target document may be of any file format including, for example, plain text (.txt), Microsoft® Word (.doc, .docx), Adobe® Acrobat (.pdf), etc. Those skilled in the art will appreciate that the technology is not limited to the aforementioned protocols. Rather, any file that may contain text, either exclusively, or in combination with non-text content (e.g. CAD files), regardless of the file format, may be processed.

In Step 402, indexing terms are obtained for the target document received in Step 400. Indexing terms may be obtained by parsing the target document and by identifying the most frequently occurring terms. Indexing terms may be obtained, as previously described in Step 302.

In Step 404, the frequency of each indexing term is obtained, as previously described in Step 304.

In Step 406, document categories that are similar to the target document are identified, based on the indexing terms and frequencies obtained in Steps 402 and 404. A description of the identification of similar document categories is provided in FIG. 5.

In Step 408, the most similar documents are returned, e.g., to the user who made the search request. The most similar documents may be documents in the similar document categories identified in Step 406. For each of the documents in the similar document categories, a similarity value may be calculated as described in FIG. 5. The document similarity value may be used to generate a ranking of the archived documents in the similar document categories. The ranking may be generated within similar document categories or across similar document categories. The most similar documents, based on the ranking, may be returned.

FIG. 5 shows a method for calculating a document similarity, required for archiving documents and for identifying documents with similarities to a target document. The method may be used to obtain a document similarity value that quantifies the similarity between a document to be processed (e.g., a document to be archived, as described in FIG. 3, or a document for which similar documents are to be identified, as described in FIG. 4) and either an archived document or a document category.

Turning to FIG. 5, in Step 500, document categories or archived documents that include the indexing terms of the document are identified. If multiple document categories are identified in Step 500, Steps 502-510 may be performed for each of the identified document categories. Similar document categories or archived documents are identified as follows, in accordance with one or more embodiments of the technology. Document categories/archived documents with the most indexing terms similar to the document to be processed are identified. This identification may result in zero to many document categories/archived documents. Only a limited number of document categories/archived documents may be selected for further processing in Step 502-510. For example, only the document categories/archived documents that have a least a specified number of indexing terms in common with the document to be processed may be selected.

In Step 502, a similarity value is calculated. The similarity value quantitatively expresses the similarity between the document to be processed and a document category/archived document. In one embodiment of the technology, the similarity value is based on cosine similarity. One vector is generated from the term frequencies associated with the indexing terms of the document to be processed, and one vector is generated from the term frequencies associated with the indexing terms of the document category/archived document. Each of these vectors describes the associated document/document category in a multi-dimensional vector space, in which one dimension exists for each of the indexing terms. The cosine similarity is subsequently calculated as the angle between the two vectors. The cosine similarity, in accordance with an embodiment of the technology is in a range between 0 and 1, with 0 indicating no similarity and 1 indicating maximum similarity. Those skilled in the art will appreciate that many methods exist for quantifying a similarity between documents, and the technology is therefore not limited to the use of cosine similarity.

In Step 504, a determination is made about whether the similarity value is above a strong similarity threshold. For any pair of a document to be processed and a document category/an archived document, a similarity value at or above the strong similarity threshold indicates a high degree of similarity between the document to be processed and the document category/archived document. A similarity value below the strong similarity threshold indicates a weak degree of similarity (or potentially no similarity at all). In one embodiment of the technology, a cosine similarity at or above 0.78 is considered a strong similarity. If the similarity is above the strong similarity threshold, the method may proceed to Step 506. If the similarity is below the similarity threshold, the method may proceed to Step 508.

In Step 506, the document is flagged as highly similar to the document category/archived document.

In Step 508, a determination is made about whether the similarity value is above a weak similarity threshold. For any pair of a document to be processed and a document category/an archived document, a similarity value at or above the weak similarity threshold indicates a weak degree of similarity between the document to be processed and the document category/archived documents. A similarity value below the weak similarity threshold indicates that there is no (or only very weak) similarity. In one embodiment of the technology, a cosine similarity of 0.2 is considered the minimum value that indicates a weak similarity. If the similarity is above the weak similarity threshold, the method may proceed to Step 510. If the similarity is below the similarity threshold, the execution of the method for the examined pair of a document to be processed and a document category/archived document may terminate.

In Step 510, the document is flagged as weakly similar to the document category/archived document.

Those skilled in the art will appreciate that different thresholds may be used for the detection of weak and strong similarities. Further these thresholds may differ depending on whether the method of FIG. 5 is used for archiving a document (FIG. 3) or for performing a similarity detection (FIG. 4).

The use case scenario described below is intended to provide an example of the method for document similarity analysis based on weak transitive relation of similarity, described in FIGS. 3-5. The use case scenario is for illustrative purposes only, and the methods described by FIGS. 3-5 are not limited to the subsequently described scenario.

Consider a scenario in which a document A and a document B are very similar (cosine similarity >0.78). A number of document categories already exist when the method of FIG. 3 is executed for documents A and B. Assume that there is a document category X, for which there is a strong similarity (cosine similarity >0.78) with document A, but only weak similarity (cosine similarity between 0.2 and 0.78) with document B. Further, assume that there is a document category Y, for which there is a weak similarity (cosine similarity between 0.2 and 0.78) with document B, and a weak similarity (cosine similarity between 0.2 and 0.78) with document A. In a conventional system, document A would thus be registered in document category X, and document B would be registered in document category Y. A search may therefore miss one of the documents because they are not in the same categories. However, when executing the method of FIG. 3, in accordance with an embodiment of the technology, for document A, both category X and category Y are identified in Step 306, and accordingly document A is registered in categories X and Y. Next, when executing the method for document B, a new category Z is generated in Step 310, because no category with a strong similarity to document B was found. Document B is registered in category Z, but it is also registered in categories X and Y. Because documents A and B are registered in the same categories (X, Y), there is a substantially lower likelihood that a search, as described in FIG. 4, will miss one of the documents.

Embodiments of the technology may enable a system to identify similar documents. Similarity of a target document with one or more archived documents is assessed based on a quantitative measure for similarity, such as the cosine similarity. In one embodiment of the technology, weak transitive relations of similarity are relied upon to ensure that very similar documents are always collocated in the same document category, thus guaranteeing that a document search does not miss one or more of the similar documents.

The document content similarity analysis, in accordance with one embodiment of the technology may be provided as a service. A user of the service may, for example, upload a reference document and one or more documents to be analyzed for content similarities, and may then receive the result of the similarity analysis from the service.

Embodiments of the technology may be implemented on a computing system. Any combination of mobile, desktop, server, embedded, or other types of hardware may be used. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (600) may be located at a remote location and connected to the other elements over a network (612). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for document similarity analysis, the method comprising:
    obtaining, by a document categorization and search engine executing on a processor, a first document;
    obtaining, for the first document, first document index terms;
    identifying a first document category similar to the first document, based on first category index term frequencies;
    calculating a first similarity value between the first document and the first document category;
    making a first determination that the first similarity value does not exceed a strong similarity threshold;
    making a second determination that the first similarity value exceeds a weak similarity threshold; and based on the first and second determinations:
    making a first association between the first document and the first document category, wherein the first association specifies a weak similarity;
    generating a second document category; and
    making a second association between the first document and the second document category.

2. The method of claim 1, wherein the first similarity value is calculated using a cosine similarity between first document index term frequencies and the first category index term frequencies.

3. The method of claim 2, wherein the first similarity value exceeds the weak similarity threshold when the first similarity value is at least 0.2.

4. The method of claim 1, wherein generating the second document category comprises:
    assigning the first document index terms and first document index term frequencies to the second document category.

5. The method of claim 1, further comprising:
    obtaining a second document;
    obtaining, for the second document, second document index terms and second document index term frequencies;
    identifying a third document category similar to the second document, based on the second document index terms and the second document index term frequencies;
    calculating a second similarity value between the second document and the third document category;
    making a third determination that the second similarity value exceeds the strong similarity threshold; and
    based on the third determination:
        making a third association between the second document and the third document category.

6. The method of claim 5, wherein;
    the second similarity value is a cosine similarity; and
    the second similarity value exceeds the strong similarity threshold when the second similarity value is at least 0.78.

7. The method of claim 1, further comprising:
    obtaining a target document;
    obtaining target index terms for the target document;
    identifying a target document category similar to the target document, based on the target index terms; and
    identifying, in the target document category, a similar document.

8. A non-transitory computer-readable medium comprising instructions that, when executed by a processor, perform a method comprising:
    obtaining a first document;
    obtaining, for the first document, first document index terms;
    identifying a first document category similar to the first document, based on first category index term frequencies;
    calculating a first similarity value between the first document and the first document category;
    making a first determination that the first similarity value does not exceed a strong similarity threshold;
    making a second determination that the first similarity value exceeds a weak similarity threshold; and
    based on the first and second determinations:
        making a first association between the first document and the first document category, wherein the first association specifies a weak similarity;
        generating a second document category; and
        making a second association between the first document and the second document category.

9. The non-transitory computer-readable medium of claim 8, wherein the first similarity value is calculated using a cosine similarity between first document index term frequencies and the first category index term frequencies.

10. The non-transitory computer-readable medium of claim 8, wherein generating the second document category comprises:
    assigning the first document index terms and first document index term frequencies to the second document category.

11. The non-transitory computer-readable medium of claim 8, wherein the method further comprises:
    obtaining a second document;
    obtaining, for the second document, second document index terms and second document index term frequencies;
    identifying a third document category similar to the second document, based on the second document index terms and the second document index term frequencies;
    calculating a second similarity value between the second document and the third document category;
    making a third determination that the second similarity value exceeds the strong similarity threshold; and
    based on the third determination:
        making a third association between the second document and the third document category.

12. The non-transitory computer-readable medium of claim 8, wherein the method further comprises:
    obtaining a target document;
    obtaining target index terms for the target document;
    identifying a target document category similar to the target document, based on the target index terms; and
    identifying, in the target document category, a similar document.

13. A system for document similarity analysis comprising:
    a document repository;
    memory, wherein the memory comprises instructions; and
    a processor, executing a document categorization and search engine, wherein the instructions are executed by the processor to perform a method comprising:
        obtaining, by the document categorization and search engine, a first document;
        obtaining, for the first document, first document index terms;
        identifying, in the document repository, a first document category similar to the first document, based on first category index term frequencies;
        calculating a first similarity value between the first document and the first document category;
        making a first determination that the first similarity value does not exceed a strong similarity threshold;
        making a second determination that the first similarity value exceeds a weak similarity threshold; and
        based on the first and second determinations:
            making a first association between the first document and the first document category, wherein the first association specifies a weak similarity;
            generating a second document category; and
            making a second association between the first document and the second document category.

14. The system of claim 13, wherein the first similarity value is calculated using a cosine similarity between first document index term frequencies and the first category index term frequencies.

15. The system of claim 13, wherein generating the second document category comprises:
- assigning the first document index terms and first document index term frequencies to the second document category.

16. The system of claim 13, wherein the method further comprises:
- obtaining a second document;
- obtaining, for the second document, second document index terms and second document index term frequencies;
- identifying, in the document repository, a third document category similar to the second document, based on the second document index terms and the second document index term frequencies;
- calculating a second similarity value between the second document and the third document category;
- making a third determination that the second similarity value exceeds the strong similarity threshold; and
- based on the third determination:
  - making a third association between the second document and the third document category.

17. The system of claim 13, wherein the method further comprises:
- obtaining a target document;
- obtaining target index terms for the target document;
- identifying, in the document repository, a target document category similar to the target document, based on the target index terms; and
- identifying, in the target document category, a similar document.

* * * * *